United States Patent
Merten (10) Patent No.: US 11,383,938 B2
(45) Date of Patent: Jul. 12, 2022

(54) APPARATUS AND METHOD FOR FEEDING HANGING CONVEYABLE ARTICLES INTO A HANGING CONVEYING INSTALLATION, AND HANGING CONVEYING INSTALLATION HAVING SUCH AN APPARATUS

(71) Applicant: Dürkopp Fördertechnik GmbH, Bielefeld (DE)

(72) Inventor: Markus Merten, Bielefeld (DE)

(73) Assignee: DüRKOPP FÖRDERTECHNIK GMBH, Bielefeld (DE)

( * ) Notice: Subject to any disclaimer, the term of this patent is extended or adjusted under 35 U.S.C. 154(b) by 5 days.

(21) Appl. No.: 16/912,332

(22) Filed: Jun. 25, 2020

(65) Prior Publication Data

US 2021/0101756 A1  Apr. 8, 2021

(30) Foreign Application Priority Data

Oct. 4, 2019  (DE) ............ 10 2019 215 304.6

(51) Int. Cl.
 *B65G 47/61* (2006.01)
 *B65G 17/20* (2006.01)

(52) U.S. Cl.
 CPC ............ *B65G 47/61* (2013.01); *B65G 17/20* (2013.01); *B65G 2201/0229* (2013.01)

(58) Field of Classification Search
 CPC .......... B65G 47/61; B65G 2201/0229; B65G 17/20; B65G 2201/0238; B65G 9/004; B65G 9/006; B65G 9/008; B65G 9/00; B65G 43/08
 See application file for complete search history.

(56) References Cited

U.S. PATENT DOCUMENTS

| | | | | |
|---|---|---|---|---|
| 5,072,822 A | * | 12/1991 | Smith | B07C 5/3412 198/349 |
| 5,897,004 A | * | 4/1999 | Neugebauer | B65G 47/61 211/162 |
| 5,975,279 A | * | 11/1999 | Blattner | B65G 33/02 198/459.4 |
| 8,408,380 B2 | | 4/2013 | Doane | |
| 8,561,787 B2 | | 10/2013 | Wend et al. | |

(Continued)

FOREIGN PATENT DOCUMENTS

| CH | 714004 A1 | 1/2019 |
|---|---|---|
| DE | 9003011 U1 | 7/1991 |

(Continued)

OTHER PUBLICATIONS

Arnold et al., Handbuch Logistik, 2002, pp. 613-616—Section C2, Springer-Verlag Berlin Heidelberg, ISBN 978-3-540-72928-0.

*Primary Examiner* — Mark A Deuble
(74) *Attorney, Agent, or Firm* — McGlew and Tuttle, P.C.

(57) ABSTRACT

An apparatus for feeding hanging conveyable articles into a hanging conveying installation includes a feeding unit for the individualized feeding of the hanging conveyable articles into a conveying system of the hanging conveying installation with a variably settable transport spacing. The feeding unit has an individualizing element for stopping the hanging conveyable articles (4), and a detection unit for detecting the thickness of the individual hanging conveyable articles.

20 Claims, 3 Drawing Sheets

(56) References Cited

U.S. PATENT DOCUMENTS

| | | | | |
|---|---|---|---|---|
| 8,672,118 | B2* | 3/2014 | Janzen | B65G 47/61 |
| | | | | 198/678.1 |
| 9,027,734 | B2* | 5/2015 | Wend | B65G 19/025 |
| | | | | 198/459.6 |
| 9,427,907 | B2* | 8/2016 | Van Hamme | B29C 49/78 |
| 9,440,791 | B2* | 9/2016 | Wend | B65G 1/0457 |
| 9,815,635 | B2* | 11/2017 | Sieksmeier | B65G 1/0457 |
| 10,112,783 | B2 | 10/2018 | Stauber | |
| 10,532,841 | B2* | 1/2020 | Yamagata | B65B 31/024 |
| 2009/0006533 | A1 | 1/2009 | Guo | |
| 2019/0291968 | A1* | 9/2019 | Gallati | B65G 43/10 |

FOREIGN PATENT DOCUMENTS

| | | |
|---|---|---|
| DE | 29500802 U1 | 3/1995 |
| DE | 29906532 U1 | 8/1999 |
| DE | 10 2005 006 455 A1 | 8/2006 |
| DE | 102007025553 A1 | 12/2008 |
| DE | 102010010107 A1 | 9/2011 |
| DE | 102011104511 B3 | 10/2012 |
| DE | 102011101987 A1 | 11/2012 |
| DE | 102011116086 A1 | 4/2013 |
| DE | 102011118303 A1 | 5/2013 |
| DE | 102014201301 A1 | 7/2015 |
| DE | 102014203239 A1 | 8/2015 |
| DE | 102016110898 B3 | 6/2017 |
| EP | 0765826 A1 | 4/1997 |
| EP | 0780327 A1 | 4/1997 |
| EP | 1 690 811 A1 | 8/2006 |
| EP | 2196415 A1 | 6/2010 |
| EP | 2363358 A2 | 9/2011 |
| EP | 2899144 A1 | 7/2015 |
| EP | 3395451 A1 * 10/2018 ............ B65G 43/08 |
| EP | 3543181 A1 | 9/2019 |

* cited by examiner

APPARATUS AND METHOD FOR FEEDING HANGING CONVEYABLE ARTICLES INTO A HANGING CONVEYING INSTALLATION, AND HANGING CONVEYING INSTALLATION HAVING SUCH AN APPARATUS

CROSS REFERENCES TO RELATED APPLICATIONS

The present patent application claims the priority of German Patent Application, Serial No. DE 10 2019 215 304.6, filed Oct. 4, 2019, the content of which is incorporated herein by reference in its entirety as if fully set forth herein.

FIELD OF THE INVENTION

The invention relates to an apparatus and a method for feeding hanging conveyable articles into a hanging conveying installation and to a hanging conveying installation having such an apparatus.

BACKGROUND OF THE INVENTION

DE 10 2005 006 455 A1 discloses a hanging conveying installation having a conveying system for conveying hanging conveyable articles. The conveying system has a fixed carry-along action. The hanging conveyable articles are conveyed with a set transport spacing. The smaller the transport spacing, the greater the capacity of the conveyor per unit time for a constant conveying speed. If the transport spacing is set too low and is in particular less than the thickness of the hanging conveyable article, disturbances can occur during operation of the hanging conveying installation if hanging conveyable articles are in contact with one another. If the transport spacing is selected too high, the conveying capacity of the hanging conveying installation is reduced.

SUMMARY OF THE INVENTION

It is an object of the present invention to improve the conveyance of hanging conveyable articles in a hanging conveying installation, in particular to ensure disturbance-free conveyance with the highest possible capacity efficiency.

This object is achieved according to the invention by an apparatus for feeding hanging conveyable articles into a hanging conveying installation, comprising
a. a feeding unit for the individualized feeding of the hanging conveyable articles into a conveying system of the hanging conveying installation with a variably settable transport spacing, wherein the feeding unit has an individualizing element for individualizing the hanging conveyable articles,
b. a detection unit for detecting the thickness of the individual hanging conveyable articles.

This object is further achieved by a hanging conveying installation comprising
a. an apparatus according to one of the preceding claims,
b. a conveying system, which is conveyingly connected to the apparatus, for carrying along the fed hanging conveyable articles.

This object is further achieved by a method for feeding hanging conveyable articles into a hanging conveying installation, comprising the method steps of stopping the hanging conveyable articles by means of an individualizing element of a feeding unit,
detecting the thickness of the individual hanging conveyable articles by means of a detection unit,
individualized feeding of the hanging conveyable articles into a conveying system of the hanging conveying installation with a variably settable transport spacing.

It has been recognized according to the invention that the conveyance of hanging conveyable articles in a hanging conveying installation is improved if the hanging conveyable articles are discharged into a conveying system of the hanging conveying installation with a variably settable transport spacing. In particular, the transport spacing is individually variably set for each individual hanging conveyable article. The individual setting of the transport spacing occurs in dependence on the respective thickness of the individual hanging conveyable articles. The thickness of the hanging conveyable articles extends parallel to the conveying direction along the hanging conveying installation. The respective thickness of the hanging conveyable articles is detected by means of a detection unit. The feeding of the hanging conveyable articles with the variably set transport spacing reduces and in particular rules out the risk of a disturbance during the operation of the hanging conveying installation. The conveying capacity of the hanging conveying installation can be optimally utilized. Transport spacings selected too high between hanging conveyable articles which have only a small thickness are ruled out.

A hanging conveyable article has in particular a transport pocket by means of which one or more individual articles can be conveyed. Such a transport pocket is known for example from EP 2 196 415 A2, to which reference is hereby made. A transport pocket has in particular at least in part a flexible side wall. The thickness of the transport pocket results from the thickness of the individual article conveyed in the transport pocket. The thickness of the hanging conveyable article is not known a priori.

A hanging conveyable article can also have a clothes hanger on which an item of clothing is conveyed hanging. The thickness of the hanging conveyable article varies in dependence on the thickness of the item of clothing and/or of the clothes hanger. The thickness of the item of clothing can differ in dependence on the type of the item of clothing, its size and/or if it is winterwear or summerwear.

The hanging conveyable article can be conveyed directly by the conveying system of the hanging conveying installation. The hanging conveyable article can be transported by means of a hanging adapter, as is known from DE 10 2005 006 455 A1, to which reference is hereby made. The hanging adapter has a carry-along portion which ensures that it is carried along in the conveying system of the hanging conveying installation. The hanging adapter additionally has a receiving opening into which a transport pocket or a clothes hanger can be hanging.

The apparatus comprises a detection unit which serves for detecting the thickness of the individual hanging conveyable articles. The detection unit is used in particular to define a detection region in which at least one hanging conveyable article, in particular a plurality of hanging conveyable articles, is/are arranged. The detection region is formed in particular by a light grid which has along the conveying direction a light grid length which is at least 100 mm, in particular at least 150 mm, in particular at least 200 mm and in particular exactly 200 mm. In particular, the light grid length is at most 400 mm, in particular at most 300 mm and in particular at most 200 mm.

The feeding unit comprises in particular an individualizing element by means of which the hanging conveyable articles are fed individualized into the conveying system. The individualizing element is arranged in particular downstream of the detection region. The individualizing element is in particular a stopping element. Instead of the stopping element, the individualizing element can also be configured as a conveying screw with an external thread groove or as a threaded spindle.

The stopping and/or individualized feeding of the hanging conveyable articles occur/occurs in particular by means of the individualizing element. If the individualizing element is configured as a stopping element, the stopping occurs by virtue of the stopping element blocking further conveyance, in particular under gravitational force, of the hanging conveyable articles. The individualized feeding of the hanging conveyable articles can occur by means of the stopping element by virtue of the fact that the latter is temporarily displaced into a release position and allows conveyance of one or more hanging conveyable articles. After the hanging conveyable article or articles has/have been fed, the stopping element can be displaced again into the blocking position. In particular, the individualized feeding of the hanging conveyable articles is simplified if there is additionally provided a further stopping element which is arranged in particular downstream of the first stopping element. The second stopping element remains closed if the first stopping element is opened in order to release one or more hanging conveyable articles from the detection region. The further stopping element remains in the blocking position until the hanging conveyable articles to be fed have been released by the first stopping element. The first stopping element is then displaced into the blocking position again. The second stopping element can subsequently be displaced into the release position and feed the hanging conveyable articles arranged between the first and the second stopping element into the conveying system. In particular, the two stopping elements are arranged along the conveying direction at a minimum spacing from one another which is of such size that at least one hanging conveyable article, in particular one hanging conveyable article adapter, can be arranged between the stopping elements. In particular, the minimum spacing is set in such a way that at least two hanging conveyable articles, in particular at least three hanging conveyable articles, in particular at least four hanging conveyable articles, and in particular up to eight hanging conveyable articles, can be arranged between the two stopping elements.

Stopping of the hanging conveyable articles by means of a screw or spindle correspondingly occurs by the spindle or screw being stopped, that is to say not rotated. Feeding of the hanging conveyable articles occurs by rotating the screw or the spindle.

In order to detect the thickness of the individual hanging conveyable articles, in particular the number of hanging conveyable articles in the detection region is determined, with in particular the number of hanging conveyable articles in the detection region being counted. The number of hanging conveyable articles in the detection region is between 0 items and 8 items or more. Depending on the thickness of the hanging conveyable articles, it is possible for more or fewer hanging conveyable articles to be arranged in the detection region. The counting of the hanging conveyable articles occurs in particular by counting the number of hanging adapters by means of each of which a hanging conveyable article is transported in the hanging conveying installation.

An average pocket thickness of the hanging conveyable articles arranged in the detection region can be calculated from the defined length of the detection region and from the number of hanging conveyable articles arranged therein, in particular the number of hanging adapters arranged therein. In particular, an average pocket spacing is set on the basis of the calculated, average pocket thickness for the group of hanging conveyable articles in the detection region. Individual hanging conveyable articles and/or groups with a plurality of hanging conveyable articles can then be fed into the conveying system of the hanging conveying installation. Individualized feeding of hanging conveyable articles is also to be understood as meaning that a group of hanging conveyable articles is fed directly in succession into the conveying system of the hanging conveying installation.

In particular, the counting of the number of hanging conveyable articles, in particular of hanging conveying adapters, is repeated cyclically and in particular continuously, in particular as soon as a hanging conveyable article and/or a group of hanging conveyable articles have/has been fed from the detection region into the conveying system of the hanging conveying installation. There can correspondingly result a changed average pocket thickness, and a new average pocket spacing differing from the previous average pocket spacing can be set with which a hanging conveyable article and/or a group of hanging conveyable articles can then again be fed into the conveying system.

The detection region is arranged in particular along the hanging conveying installation, in particular on an accumulating section having a conveying rail. The conveying rail is arranged at an inclination in relation to the horizontal with an angle of inclination different from 0°. The angle of inclination is in particular between 1° and 10°. The hanging conveyable articles are conveyed along the inclined conveying rail under gravitational force towards the individualizing element. Additionally or alternatively, the conveying rail can have a conveying drive in order to actively convey the hanging conveyable articles. In particular, a so-called accumulating conveying with drivers is provided. With regard to details of the construction and the function of the accumulating conveyor, reference is explicitly made to DE 10 2010 010 107 A1.

A detection unit having a sensor, in particular an optical sensor, in particular a light grid, allows direct, in particular contactless, detection of the thickness of the hanging conveyable articles. The detection unit is a measuring unit. In particular, the sensor is an optical sensor and in particular a light grid. Additionally or alternatively, the measuring unit can have an image-processing system, in particular a camera, in order to contactlessly measure the thickness of the hanging conveyable articles.

Additionally or alternatively, the detection unit can have a reading unit. The reading unit is suitable for communicating, in particular contactlessly, with a data carrier. Data characterizing the individual article, in particular the thickness of the hanging conveyable article, are stored in the data carrier. The data carrier is in particular an RFID chip which can be read by means of the reading unit in the form of a transponder reader, in particular as the hanging conveyable articles move past. In particular, it is not required to stop the transport of the hanging conveyable articles to read the data of the data carrier. It is possible for example for the data on the data carrier to have been transmitted to the data carrier by a central control unit, a so-called store management system. Alternatively, the data can have been detected beforehand at a central measuring station of a hanging conveying installation and assigned to the data carrier.

Alternatively, it is also possible that the data characterizing the hanging conveyable article are not stored directly on the data carrier, but an identification of the hanging conveyable article occurs by way of an identification means, such as for example a barcode, a QR code and/or a unique parts number of the hanging adapter or of a clothes hanger, and the respective thickness of the hanging conveyable article is stored in the central control unit. It is then possible by means of the central control unit to uniquely assign the thickness of the hanging conveyable article.

The advantage of a reading unit lies in the fact that a measuring unit is unnecessary. A true measurement and in particular the associated accuracy deviations are avoided.

An evaluation unit for variably setting the transport spacing for the hanging conveyable article to be fed in dependence on the determined thickness simplifies the variable setting of the transport spacing. The evaluation unit is in particular in signal communication with the detection unit. The transport spacing is set by means of the evaluation unit in dependence on the determined thickness. For this purpose, an evaluation table can be stored in the evaluation unit. Particularly for a predetermined conveying speed of the conveying system, different thicknesses are each assigned a transport spacing in the evaluation table. In particular, a plurality of evaluation tables, in each case for different conveying speeds, are stored in the evaluation unit. In particular, size intervals are defined for the thickness which are each assigned a specified transport spacing. If the thickness of the hanging conveyable article corresponds to a value stored in the evaluation table, the associated transport spacing is determined directly. If the determined thickness lies between two thickness values stored in the evaluation table, the corresponding transport spacing can be determined by linear interpolation of the table values. For this purpose, the evaluation unit can have an, in particular integrated, computing unit. Alternatively, the transport spacing can also be assigned to the next-larger thickness which is stored in the evaluation table. In particular, the evaluation unit is in signal communication with the feeding unit and in particular with the stopping element.

An apparatus, in which the transport spacing can be variably set in a stepless or stepwise manner, allows a variably changeable setting of the transport spacing. A stepless setting of the transport spacing particularly allows maximum flexibility when feeding the hanging conveyable articles. In particular, the transport spacing can be determined by multiplying the detected thickness by an adjustable factor, the so-called expansion factor. The expansion factor is greater than 1, in particular at least 1.5, in particular at least 2, in particular at least 3, in particular at least 3.5, in particular at least 4, and in particular at least 5. A stepwise setting of the transport spacing can be implemented in an uncomplicated manner.

It is advantageous if the transport spacing does not fall below an adjustable minimum transport spacing, in particular independently of the determined thickness of the hanging conveyable article. The minimum transport spacing is predetermined in particular by the conveying system.

A hanging conveying installation according to the invention substantially has the advantages of the apparatus according to the invention, to which reference is hereby made. The apparatus is conveyingly connected to a conveying system which serves to carry along the fed hanging conveyable articles. The conveyance of the hanging conveyable articles of the hanging conveying installation is ensured in a disturbance-free manner and with the highest possible conveying capacity. The hanging conveying installation is in particular a pocket conveying installation.

In particular, a storage capacity of a hanging conveying installation having an article store can be optimally utilized. In the case of a hanging conveying installation having a sorting unit, it is possible, during the individualized feeding of the hanging conveyable articles, for additional parameters, besides the thickness, to be taken into consideration when setting the transport spacing, such as for example the switching cycles of control elements in the sorting unit and/or the space requirement of the hanging conveyable article in an arcuate conveying rail when discharging the hanging conveyable article.

A hanging conveying installation, in which the conveying system has a conveying means and drivers fastened thereto for the hanging conveyable articles, in particular for hanging adapters each receiving a hanging conveyable article, ensures reliable and robust conveyance of the hanging conveyable articles. A conveying chain, which is configured in particular to revolve, serves in particular as conveying means of the conveying system. Drivers which serve to carry along the hanging conveyable articles are fastened to the conveying chain.

A hanging conveying installation, in which the drivers are arranged at a regular driver spacing along the conveying means, allows the hanging conveyable articles to be carried along in a defined manner.

A driver spacing being less than a maximum thickness of the hanging conveyable articles, wherein the following holds in particular: $d_A<0.5 \cdot D_{F,max}$, in particular $d_A<0.2 \cdot D_{F,max}$, in particular $d_A<0.1 \cdot D_{F,max}$ and in particular $d_A<0.05 \cdot D_{F,max}$, allows a particularly efficient implementation of the invention. The smaller the driver spacing selected, the larger the resolution for the transport spacing. The larger the resolution for the transport spacing, the more precisely the transport spacing can be set. A precise setting of the transport spacing brings about optimization of the hanging conveying installation in terms of a transport spacing which is as small as possible for the conveying capacity on the one hand and in terms of the transport spacing which is as large as possible for the disturbance-free operation on the other hand. In particular, the driver spacing is considerably less than the maximum thickness of a hanging conveyable article in the hanging conveying installation. The maximum thickness is understood as meaning the value which can be assumed by a thickness for all conveyable articles. The maximum thickness is set in particular by the individual articles to be conveyed and/or the transport pocket used therefor. In particular, the maximum thickness of the hanging conveyable articles is more than 200 mm, in particular at least 220 mm, in particular at least 240 mm, in particular at least 250 mm, and in particular at most 300 mm.

An article store for storing the hanging conveyable articles allows storage, in particular buffer storage, of the hanging conveyable articles in the hanging conveying installation.

A sorting unit for sorting the hanging conveyable articles allows sorting of the hanging conveyable articles in the hanging conveying installation.

The method according to the invention has substantially the advantages of the apparatus and of the hanging conveying installation, to which reference is hereby made. It is essential that the thickness of the individual hanging conveyable articles is detected and the transport spacing with which the hanging conveyable articles are fed into the conveying system of the hanging conveying installation is variably set.

A method, in which the feeding of the hanging conveyable articles occurs by releasing the first stopping element, ensures particularly uncomplicated feeding of the hanging conveyable articles. This can occur in particular by, in particular controlled, release of the stopping element.

A variable setting of the transport spacing for the hanging conveyable article to be fed in dependence on the determined thickness by means of an evaluation unit ensures the disturbance-free conveyance of the hanging conveyable articles with the highest possible conveying capacity.

Both the features specified above and the features specified in the following embodiment of the apparatus according to the invention are suitable in each case on their own or in combination with one another to develop the subject matter according to the invention. The respective combinations of features do not represent any limitation in terms of the developments of the subject matter of the invention, but substantially merely have an exemplary character.

Additional features, advantageous embodiments and details of the invention will emerge from the following description of an exemplary embodiment with reference to the drawing.

DESCRIPTION OF THE PREFERRED EMBODIMENTS

Figure 1:
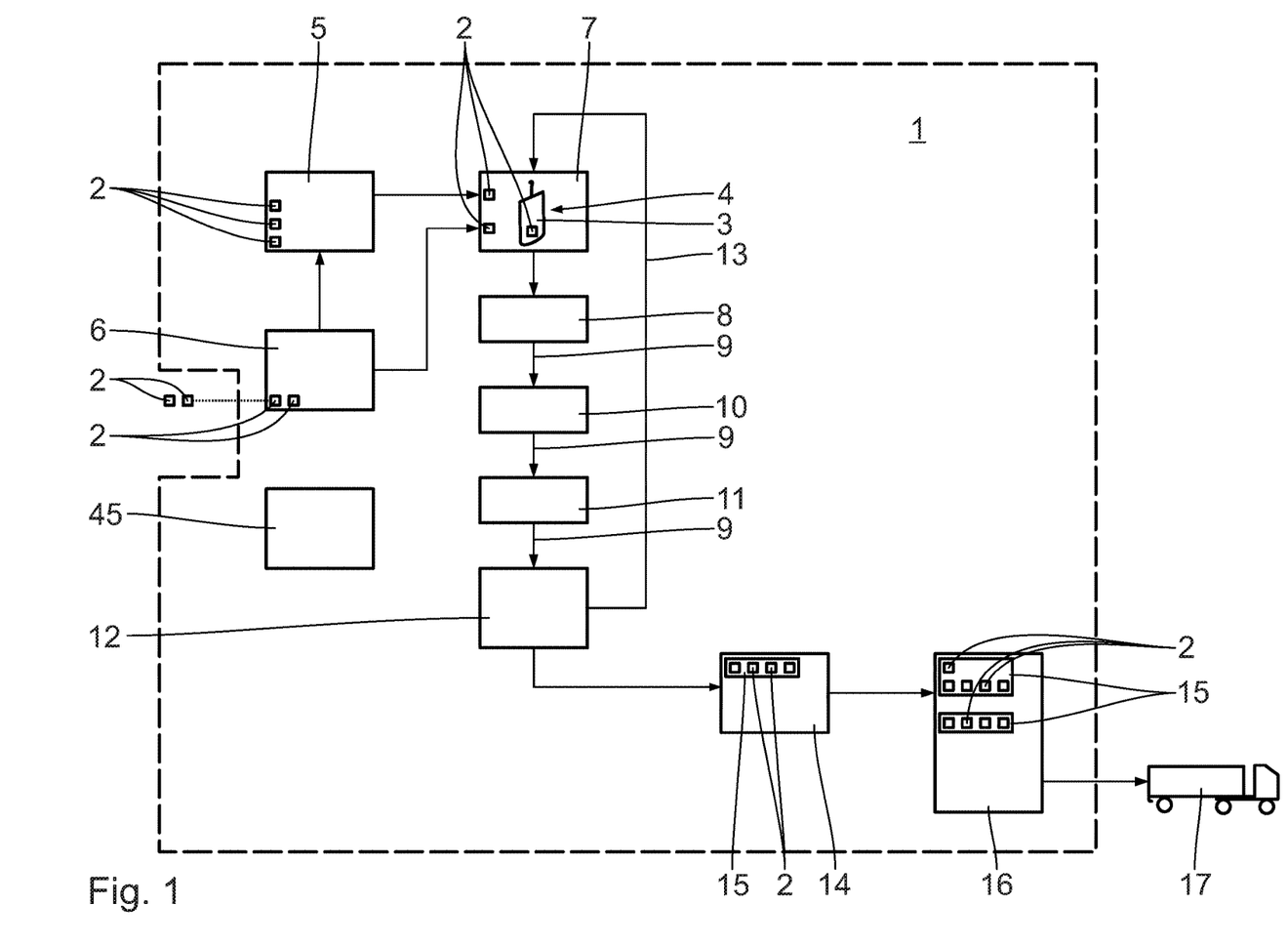
FIG. 1 shows a schematic illustration of a hanging conveying installation.

A hanging conveying installation denoted overall by 1 in FIG. 1 serves for conveying and/or transporting individual articles 2. The individual articles 2 are conveyed in the hanging conveying installation 1, in particular individualized, while being hanging in transport pockets 3. The transport pocket 3 equipped with an individual article 2 forms a hanging conveyable article 4. The individual articles 2 are for example items of clothing packed in bags or articles packed in other transport containers, in particular cardboard boxes, from the sector of online commerce, so-called E-commerce.

As transport means, the hanging conveyable article 4 can alternatively also comprise a clothes hanger on which an item of clothing is conveyed hanging.

The hanging conveying installation 1 comprises an article store 5 in which the individual articles 2 are put into storage. The article store 5 can be configured as a manual store or as an automatic store. The hanging conveying installation 1 further has an article inlet 6 via which the individual articles 2 are supplied to the hanging conveying installation 1, in particular from outside. It is also possible for return articles to be supplied to the article inlet 6.

The article inlet 6 is conveyingly connected to the article store 5. The conveying connection is for example a conveyor belt or a manual feed of the individual articles 2 to the article store 5, with it in particular also being possible for said individual articles to be present in containers in the article inlet 6.

The hanging conveying installation 1 further comprises at least one loading station 7 at which the individual articles 2 are loaded into the transport pocket 3. The loading station 7 is conveyingly connected both to the article store 5 and to the article inlet 6, in each case independently. The conveying connection allows the individual articles 2 to be conveyed from the article store 5 and/or from the article inlet 6 to the loading station 7. The individual articles can also be conveyed manually to the loading station 7 from the article store 5 and/or the article inlet 6, in particular by means of a spring-bottom trolley or a pallet goods trolley.

The hanging conveying installation 1 comprises an apparatus 8 for feeding hanging conveyable articles 4 into the hanging conveying installation 1. The hanging conveying installation 1 comprises a conveying system 9 for carrying along the fed hanging conveyable articles 4. The apparatus 8 is conveyingly connected to the conveying system 9.

The hanging conveying installation 1 comprises an article store 10 for storing, in particular for buffer storing, the hanging conveyable articles 4 in the hanging conveying installation 1.

The hanging conveying installation 1 further has a sorting unit 11 which serves for sorting the hanging conveyable articles 4, that is to say for changing the order of the hanging conveyable articles 4 in the article flow. The sorting unit 11 can have a plurality of accumulating sections which are arranged in parallel and/or in series and/or one or more revolving circuits. Additionally or alternatively, the sorting unit 11 can be configured as a matrix sorter.

The hanging conveying installation 1 has at least one unloading station 12. A plurality of, in particular three or five, unloading stations 12 can be provided for each sorting unit 11. In particular, each unloading station 12 connected to the sorting unit 11 can be reached by each revolving circuit of the sorting unit 11. The transport pockets 3 loaded with in each case an individual article 2 are opened and unloaded, in particular in an automated manner, in the unloading station 12.

The transport pockets 3 emptied in the unloading station 12 are returned via a return section 13 in the hanging conveying installation 1 and in particular made available to the loading station 7 as empty pockets for reloading with individual articles 2. The emptied transport pockets 3 can also be buffer-stored in an empty-pocket store (not shown).

The unloading station 12 is conveyingly connected to at least one packing station 14. The individual articles 2 are packed at the packing station to form a dispatch-ready order 15. The packing station 14 is conveyingly connected to an article outlet 16. The orders 15 with the individual articles 2 can leave the hanging conveying installation 1 via the article outlet 16. Orders 15 from the article outlet 16 can be transported away by way of external means of transport 17, in particular transport vehicles, in particular lorries.

The apparatus 8 will be explained in more detail below with reference to FIG. 2.

The apparatus 8 comprises an accumulating section 18 having a conveying rail 19 which ensures that the hanging conveyable articles 4 are accumulated in the region of the accumulating section 18. The conveying rail 19 is arranged at an inclination in relation to the horizontal at an angle of inclination n. The angle of inclination n is advantageously less than 15°, in particular between 1° and 12°, and in particular between 1° and 10°. The hanging conveyable articles 4 are conveyed along the inclined conveying rail 19 under gravitational force, that is to say automatically. Additionally or alternatively, the conveying rail 19 can also have a conveying drive in order to convey the hanging conveyable articles 4.

A first stopping element 20 ensures that the hanging conveyable articles 4 are accumulated at the accumulating section 18. The first stopping element 20 is arranged at a downstream end of the conveying rail 19. The first stopping element 20 is oriented in particular transversely and in particular perpendicularly to the conveying direction 21, which is predetermined by the conveying rail 19. The first stopping element 20 is arranged so as to be displaceable along a direction transversely and in particular perpendicularly to the conveying direction 21. In the arrangement shown in FIG. 2, the first stopping element 20 is in a stopping arrangement.

A detection unit 22 is arranged in the region of the accumulating section 18. The detection unit 22 serves for detecting the respective thickness $D_F$ of the individual hanging conveyable articles 4. As illustrated by way of example in FIG. 2, a hanging conveyable article 4 with a thin individual article 2 has a first thickness $D_{F,1}$ which is less than the thickness $D_{F,2}$ of a second hanging conveyable article 4 with a thick individual article 2. The detection unit 22 can have a sensor which can be configured as an optical sensor and in particular as a light grid. The detection unit 22 is then a measuring unit. The detection unit 22 can also have a reading unit.

The detection unit 22 is in signal communication with an evaluation unit 24. The evaluation unit 24 serves for variably setting the transport spacing $d_T$ for the hanging conveyable article 4 to be fed in dependence on the determined thickness $D_F$. The evaluation unit 24 is in signal communication with a feeding unit 25. The feeding unit 25 serves for the individualized feeding of the hanging conveyable articles 4 into the conveying system 9 of the hanging conveying installation 1 with a variably settable transport spacing $d_T$.

The first stopping element 20 is in particular a constituent part of the feeding unit 25.

The feeding unit 25 has a second stopping element 44 which is designed to be substantially identical to the first stopping element 20. With respect to the conveying direction 21, the second stopping element 44 is arranged downstream with respect to the first stopping element 20. The second stopping element 44 serves for the individualized feeding of the hanging conveyable articles 4 into the conveying system 9.

The hanging conveying installation 1 comprises a rail system having conveying rails 19 as in the accumulating section 18. The conveying rails 19 are arranged in succession along the conveying direction 21 and connected to one another. The hanging conveyable articles 4 are conveyed hanging on hanging adapters 26 along the conveying rails 19 of the rail system. The hanging adapters 26 are illustrated purely schematically in FIG. 2.

Figure 3:
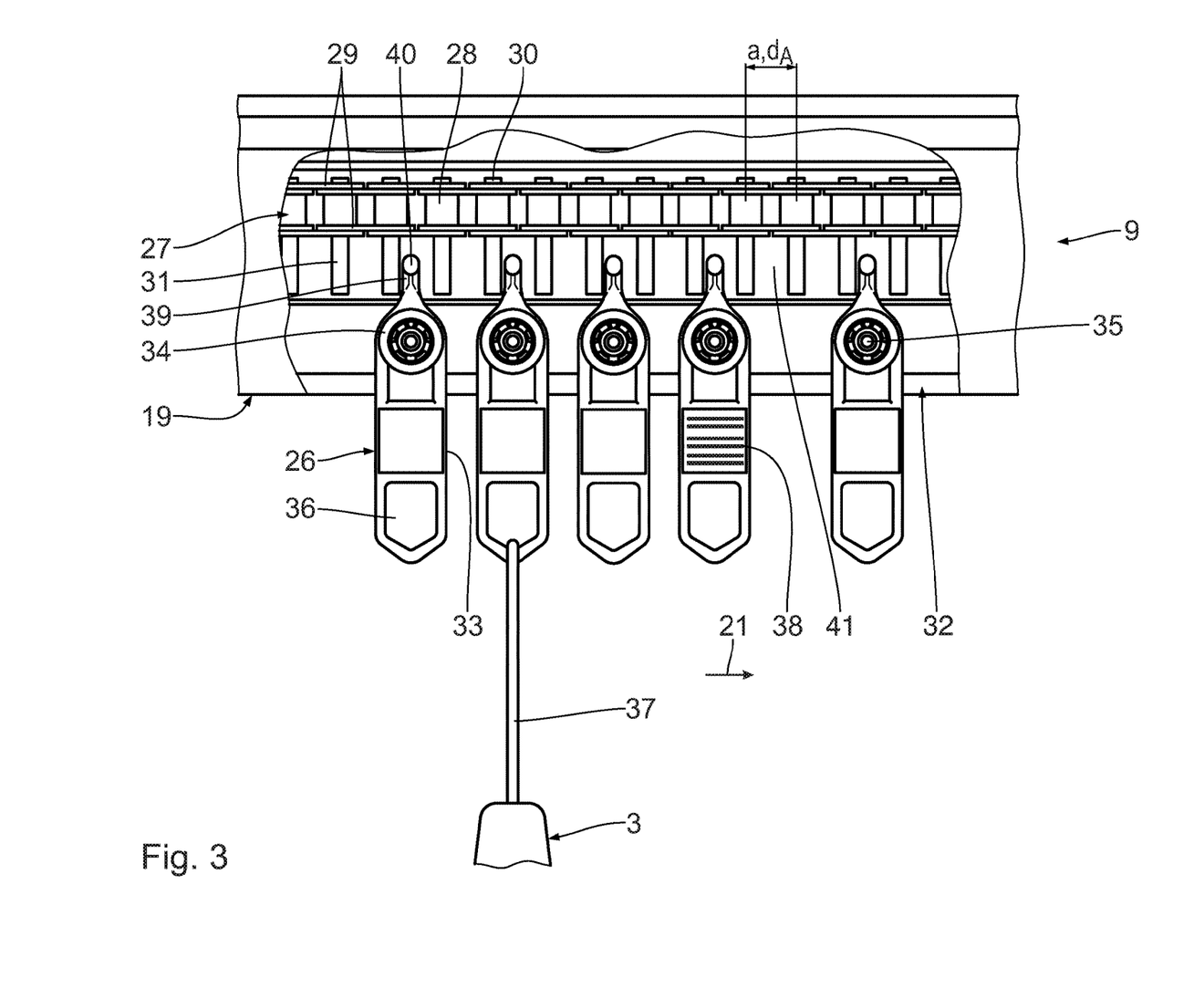
FIG. 3 shows a partially sectioned side view of a conveying system of the hanging conveying installation.

The conveying system 9 will be explained in more detail below with reference to FIG. 3.

The conveying system 9 of the hanging conveying installation 1 has the conveying rail 19, which can be installed in a space by means of a suitable supporting device. In the conveying rail 19, which takes the form of a hollow-box profile, there is arranged a conveying means 27 in the form of a conveying chain which can be driven along the conveying direction 21 by means of drive means (not shown). Also illustrated are the hanging adapters 26 which can be moved in the conveying rail 19 by means of the conveying means 27.

The conveying chain is a so-called roller chain which has rollers 28 which are connected to one another at a roller spacing a from one another so as to be pivotable by means of connecting links 29 and pins 30. The pins 30 have downwardly projecting pin-shaped extensions which serve as drivers 31. The pins 30 having the drivers 31 extend perpendicularly to the conveying rail 19 in a vertical plane defined by the conveying direction 21.

A centre spacing of adjacent drivers 31 in the conveying rail 19 in the conveying direction 21 corresponds exactly to the pitch of the conveying chain 27, that is to say to the roller spacing a, and is in this respect invariable and constant. The centre spacing of adjacent drivers 31 corresponds to a regular driver spacing $d_A$. On its underside, the conveying rail 19 has a longitudinal slot 32 which extends in the conveying direction 21. Projecting downwardly out of the conveying rail 19 through the slot 32 is a flat supporting part 33 of each hanging adapter 26. In its upper region, the hanging adapter 26 has, on both sides of the supporting part 33, a respective running roller 34 which is in each case supported on a guide web (not shown in further detail) of the conveying rail and can be displaced thereon in the conveying direction 21. There is thus present only one pair of common running rollers 34 which are rotatable about a common axis 35. The entire hanging adapter 26 can swing about the axis 35 in the conveying rail 19.

The supporting part 33 has at its lower end a receiving opening 36 into which a hook 37 of the transport pocket 3 can be hanging. It is also possible for a hook of a clothes hanger to be hanging in the receiving opening.

Between the receiving opening 36 and the underside of the conveying rail 19, an identification element 38 is arranged on the hanging adapter 26, which can be a transponder, a barcode or a QR code. The identification element 38 extends, corresponding to the arrangement of the plate-like supporting part 33, in the conveying direction 21, that is to say is situated with its main surface open transversely to the conveying direction 21, that is to say towards the side. Therefore, it is thus clearly able to be detected by means of an identification device, such as for example a barcode reader or a transponder reader.

Above the running rollers 34 there extends a stem-like attachment 39 of the hanging adapter 26 that is formed in one piece with the supporting part 33 at its upper end. At the upper end of the attachment 39 there is formed a stop 40 in the form of a transverse bar. The attachment 39 and the stop 40 have the basic shape of a hammer. The hanging adapter 26 is arranged by way of the attachment 39 and the stop 40 in an interspace 41 formed between two adjacent drivers 31. During a conveying movement of the conveying chain along the conveying direction 21, the hanging adapters are each carried along, that is to say transported, by the driver 31 trailing in the conveying direction 21. The conveying system has a fixed carry-along action.

It is advantageous if the individual articles 2 each have an individual-article identification device via which the individual articles 2 are able to be clearly identified. In the case of items of clothing, this can occur for example on the basis of the manufacturer, the article, the size and/or the colour. The identification data of the individual articles 2 can, together with the data stored in the identification element 38 of a hanging adapter 26, be transmitted by means of signals to a central control unit 45 and combined with one another in terms of data. During their transport in the hanging conveying installation 1, the individual articles 2 can be uniquely assigned via correspondingly arranged reading devices along the hanging conveying installation 1 which in particular detect the position of the transport pockets 3. As a result, individualized, targeted conveyance of the individual articles 2 along the hanging conveying installation is possible.

With regard to structural details and further details of the conveying system 9, in particular the conveying rail 19, the conveying means 27 and the hanging adapters 26, reference is expressly made to DE 10 2005 006 455 A1.

A method for operating the hanging conveying installation 1 and in particular a method for feeding the hanging conveyable articles 4 into the hanging conveying installation 1 will be described in more detail below with reference to FIGS. 1 to 3.

Individual articles 2 are supplied to the article inlet 6. From the article inlet 6 the individual articles 2 pass either directly or via the article store 5 to the loading station 7, where in each case a transport pocket 3 is loaded with an individual article 2. The transport pockets 3 loaded with individual articles 2, that is to say the hanging conveyable articles 4, are conveyed from the loading station 7 to the apparatus 8 and accumulated at the accumulating section 18. The hanging conveyable articles arranged accumulated at the accumulating section form a sample 42 of hanging conveyable articles 4. The individual thicknesses $D_F$ of the hanging conveyable articles 4 are detected by means of the detection unit 22 and transmitted to the evaluation unit 24. A transport spacing $d_T$ with which the hanging conveyable articles 4 are fed into the conveying system 9 of the hanging conveying installation 1 is set in the evaluation unit 24 in dependence on the respectively determined thickness $D_F$.

Figure 2:
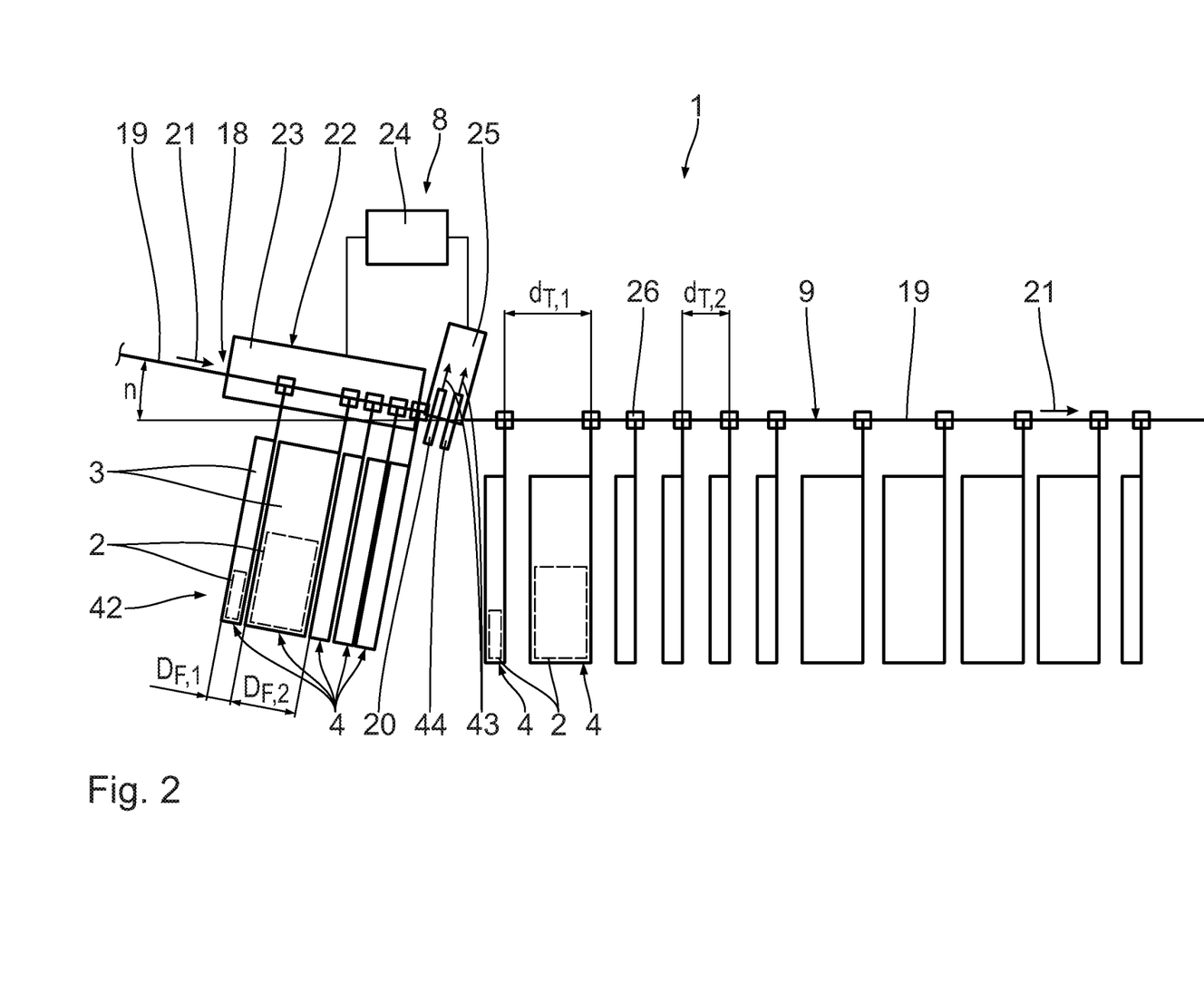
FIG. 2 shows a schematic side view of an apparatus according to the invention.

The feeding of the hanging conveyable articles 4 into the conveying system 9 occurs by virtue of the fact that the first stopping element 20 is displaced from the stopping arrangement shown in FIG. 2 into a release arrangement. For this purpose, the first stopping element 20 can be actuated by means of the feeding unit 25 along the actuating direction 43 and, owing to the inclination of the accumulating section 19, the conveyable article 4 which is arranged adjacent to the first stopping element 20 slides past it into the feeding unit 25. Alternatively or additionally, a drive can be provided on the accumulating section 19 in order to convey the hanging conveyable article 4 from the accumulating section 19 into the feeding unit. The hanging conveyable article 4 is held in the feeding unit 25 by means of the second stopping element 44. The first stopping element 20 is then displaced again into the stopping arrangement. This prevents a situation in which further hanging conveyable articles 4 can pass into the feeding unit 25. In the feeding unit 25 there is arranged in particular only a single hanging conveyable article 4, namely the article to be fed into the conveying system 9. After a defined time interval $\Delta t$, the second stopping element 44 opens and feeds the hanging conveyable article 4 individualized into the conveying system 9, and said article is carried along by one of the drivers 31.

The feeding unit 25 could also have a rotatable spindle with a screw flight, wherein a hanging conveyable article 4 is situated one at a time in each screw flight. The hanging conveyable articles 4 are fed individualized to the conveying system 9 as a result of the rotation of the spindle.

The respective transport spacing $d_T$ results in dependence on the time interval $\Delta t$ and the speed of the conveying means 27 in the conveying system 9; as illustrated in FIG. 2, the hanging conveyable articles 4 have different thicknesses $D_{F,1}$, $D_{F,2}$ in dependence on the conveyed individual article 2. Correspondingly, different transport spacings $d_{T,1}$, $d_{T,2}$ are set. The respective transport spacing of a hanging conveyable article is here oriented to the thickness $D_F$ of the preceding hanging conveyable article 4. The greater the thickness $D_F$ of the preceding hanging conveyable article 4, the greater the transport spacing $d_T$ of the trailing hanging conveyable article 4. The following holds in particular: $d_T > D_F$, in particular $d_T > 1.05 \cdot D_F$, in particular $d_T > 1.1 \cdot D_F$, in particular $d_T > 1.2 \cdot D_F$, in particular $d_T > 1.25 \cdot D_F$.

The hanging conveyable articles 4 are conveyed along the conveying system 9 with an optimal transport spacing $d_T$. The respective transport spacing $d_T$ between two adjacent hanging conveyable articles 4 is individually adapted to their width $D_F$. The respective transport spacing $d_T$ is set in such a way that a collision between adjacent hanging conveyable articles 4 and hence a disturbance of the hanging conveying installation 1 is avoided. However, the transport spacing $d_T$ is also small enough to ensure the greatest possible utilization of the conveying capacity of the hanging conveying installation 1.

It is advantageous if the detection unit 22 detects the respective thicknesses $D_{F,i}$ of all hanging conveyable articles 4 in the accumulating section 18 and transmits them to the evaluation unit 24, and the feeding unit 25 is correspondingly activated from there. The evaluation unit 24 is configured in particular as a memory-programmable controller and makes it possible to evaluate values of the thicknesses $D_{F,i}$ that are transmitted by the detection unit 22. It is advantageous when setting the transport spacings to take historical data into consideration, in particular to combine measured thicknesses $D_F$ and transport spacings $d_T$ set therefor with currently detected, in particular measured, thicknesses $D_F$. The historical data comprise the detected thicknesses $D_F$ of a specific number N of the hanging conveyable articles 4 fed most recently into the conveying system 9.

For example, the historical data comprise such small thicknesses of hanging conveyable articles which would have made it possible to set a transport spacing which is less than a required minimum transport spacing.

By virtue of the fact that the minimum transport spacing must not be fallen below for installation-related reasons, these very thin hanging conveyable articles have been fed with a transport spacing which is greater than would have been necessary. This results in a comparatively reduced conveying density which can be taken into consideration when setting the transport spacing on the basis of current data. The consideration occurs in particular in such a way that a transport spacing $d_T$ for a current hanging conveyable article 4 can be selected or set smaller than would be required according to an assignment specification used for setting the transport spacing.

On the basis of the consideration of the historical data when processing the current data, the transport spacings may possibly be set smaller than would be necessary on the basis of the setting specification, since the conveyable articles 4 newly fed into the conveying system beforehand have been fed with a low conveying density. The consideration of the historical data is possible in particular until such time as an excess of gaps that results from the very thin hanging conveyable articles 4 is eaten up by the thicker hanging conveyable articles 4. Combining historical and current data when setting the transport spacing makes it possible for the conveying capacity to be additionally increased. The installation-related minimum transport spacing has to be maintained even when compensating for the excess of gaps.

Furthermore, it is advantageous to further process the historical data of the thicknesses $D_{F,i}$. In particular, the historical data of the thicknesses can be used to determine and/or calculate an exact filling level of a discharge or storage section. In particular, storage units for hanging conveyable articles 4 can be filled more efficiently since a blanket adoption of an average thickness for each hanging conveyable article 4 is unnecessary.

The fact that the transport spacing $d_T$ is set individually makes it possible to improve a design of a discharge section of the conveying system 9. For the design, it is possible to use the respectively current, individually set transport spacing $d_T$. A design of the discharge section on the basis of a maximum thickness of hanging conveyable articles is unnecessary. As a result, the discharge sections can be filled more efficiently, in particular with a higher article density. The risk of overfilling a discharge section is prevented. The area requirement for the discharge section is increased. The investment costs for such a hanging conveying installation are reduced.

The hanging conveyable articles 4 fed into the conveying system 9 are supplied to the article store 10, the sorting unit 11 and the unloading station 12. The individual articles 2 are emptied there from the transport pocket 3, packed at packing stations 14 to form orders 15 and delivered from the article outlet 16. The emptied transport pockets 3 are returned to the loading station 7 via the return section 13. It is also conceivable for the conveying system 9 to have branch sections (not shown) in order to convey the hanging conveyable articles 4 directly past the article store 10 and/or the sorting unit 11.

What is claimed is:

1. An apparatus for feeding hanging conveyable articles into a hanging conveying installation, the apparatus comprising:
    a feeding unit for the individualized feeding of the hanging conveyable articles into a conveying system of the hanging conveying installation with a variably settable transport spacing, wherein the feeding unit comprises an individualizing element for individualizing the hanging conveyable articles;
    a detection unit for detecting a thickness of the individual hanging conveyable articles.

2. The apparatus according to claim 1, wherein the detection unit comprises a sensor.

3. The apparatus according to claim 1, wherein the detection unit comprises an optical sensor.

4. The apparatus according to claim 1, wherein the detection unit comprises a light grid.

5. The apparatus according to claim 1, comprising an evaluation unit for variably setting the transport spacing for the hanging conveyable article to be fed in dependence on the determined thickness.

6. The apparatus according to claim 1, wherein the transport spacing can be variably set in one of a stepless manner and a stepwise manner.

7. A hanging conveying installation comprising
    an apparatus according to claim 1,
    a conveying system, which is conveyingly connected to the apparatus, for carrying along the fed hanging conveyable articles.

8. The hanging conveying installation according to claim 7, wherein the conveying system comprises a conveying means and drivers fastened thereto for the hanging conveyable articles.

9. The hanging conveying installation according to claim 7, wherein the conveying system comprises a conveying means and drivers fastened thereto for hanging adapters each receiving a hanging conveyable article.

10. The hanging conveying installation according to claim 8, wherein the drivers are arranged at a regular driver spacing along the conveying means.

11. The hanging conveying installation according to claim 10, wherein:
    the conveying installation is configured based on a hanging article maximum thickness related to a maximum thickness of hanging conveyable articles to be conveyed; and
    the driver spacing is less than the hanging article maximum thickness.

12. The hanging conveying installation according to claim 11, wherein: $d_A$ is the driver spacing; $D_{F,max}$ is the maximum thickness; and $d_A < 0.5\, D_{F,max}$.

13. The hanging conveying installation according to claim 7, comprising an article store for storing the hanging conveyable articles.

14. The hanging conveying installation according to claim 7, comprising a sorting unit for sorting the hanging conveyable articles.

15. A method for feeding hanging conveyable articles into a hanging conveying installation comprising the method steps of:
    stopping the hanging conveyable articles by means of an individualizing element of a feeding unit;
    detecting the thickness of the individual hanging conveyable articles by means of a detection unit;
    individualized feeding of the hanging conveyable articles into a conveying system of the hanging conveying installation with a variably settable transport spacing.

16. The method according to claim 15, wherein the feeding of the hanging conveyable articles occurs by releasing a first stopping element of the individualizing element.

17. The method according to claim 15, comprising variable setting of the transport spacing for the hanging conveyable article to be fed in dependence on the determined thickness by means of an evaluation unit.

18. An apparatus for feeding hanging conveyable articles into a hanging conveying installation, the apparatus comprising:
    an accumulating section configured to accumulate a plurality of hanging conveyable articles;
    a detection unit configured to detect a thickness of individual hanging conveyable articles of the plurality of hanging conveyable articles at the accumulating section; and
    a feeding unit configured to feed individual hanging conveyable articles into a conveying system of the hanging conveying installation with a variably settable transport spacing, the feeding unit comprising an individualizing element configured to stop a feed of the plurality of hanging conveyable articles, set a transport spacing for each of the hanging conveyable articles and individually feed the hanging conveyable articles into the conveying system of the hanging conveying installation based on the transport spacing set for the individual hanging conveyable article that is being fed.

19. The apparatus according to claim 18, further comprising an evaluation unit for setting transport spacing for the individual hanging conveyable article that is being fed based on the thickness detected by the detection unit for the individual hanging conveyable article that is being fed.

20. The apparatus according to claim 19, in combination with the conveying system of the hanging conveying installation, wherein the conveying system is connected to the accumulating section via the feeding unit for receiving individual hanging conveyable article from the accumulating section based on a transport spacing set for each of the hanging conveyable articles by the individualizing element.

* * * * *